(No Model.)
D. M. LITTLE.
Table for Holding Photographic Plates.
No. 239,175. Patented March 22, 1881.
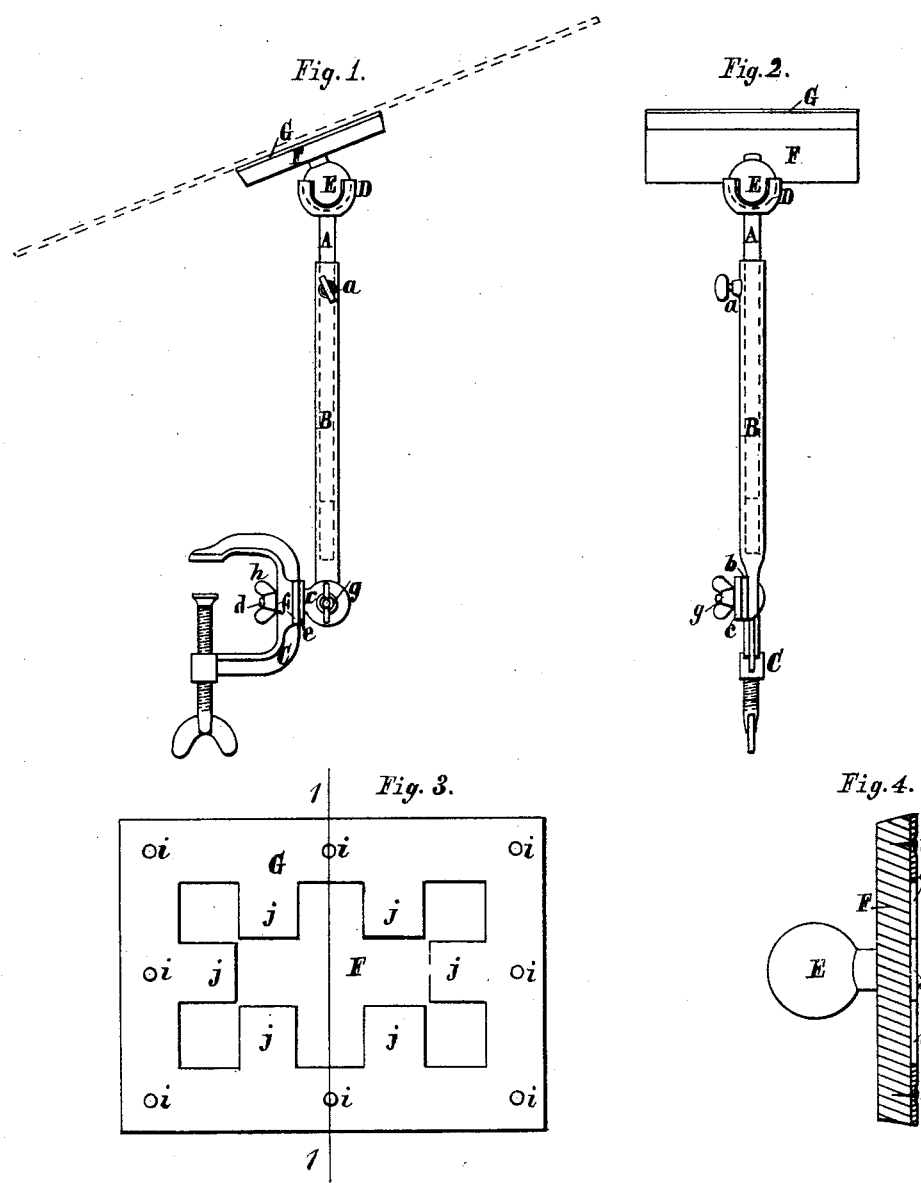

UNITED STATES PATENT OFFICE.

DAVID M. LITTLE, OF BOSTON, MASSACHUSETTS.

TABLE FOR HOLDING PHOTOGRAPHIC PLATES.

SPECIFICATION forming part of Letters Patent No. 239,175, dated March 22, 1881.

Application filed December 27, 1880. (No model.)

*To all whom it may concern:*

Be it known that I, DAVID M. LITTLE, a citizen of the United States, residing at Boston, in the county of Suffolk and State of Massachusetts, have invented a new and useful Improvement in Tables for Holding Photographic Plates, &c., of which the following is a specification, reference being had to the accompanying drawings.

My invention relates to an adjustable table having such a surface as to retain thereon glass or other plates though the table be considerably inclined, said table being especially adapted for holding photographic plates while being tipped at different inclinations to allow a liquid, as collodion, to be evenly distributed thereon.

My invention consists, first, in a table having suitably fastened thereon a sheet of rubber, or of other material, having a similar surface cut or formed so as to have ends, flaps, or points extending in various directions in the same plane and in a measure free, whereby the friction between the rubber or other material and the superincumbent plate is increased; secondly, in a support combined with said table, being connected with the table by a ball-and-socket joint, and to a clamp for fastening the device to a bench or other fixed object by joints which may be adjusted.

In the drawings, Figures 1 and 2 are elevations taken from different sides of a device embodying my invention. Fig. 3 is a plan of the table drawn on a larger scale, and Fig. 4 is a section taken on line 1 1 in Fig. 3.

The support is made adjustable longitudinally by having a part, A, fitted to slide in the tubular part B, these parts being held in any relative position by the set-screw $a$. This support is also adjustable for any inclined position by means of the two plates $b$ and $c$ (one, $b$, being fixed to the part B, and the other, $c$, to the stud $d$) and the two plates $e$ and $f$, (one, $e$, being fixed to the stud $d$, and the other, $f$, to the clamp C,) the screw and nut $g$ and the nut $h$ holding the plates in relation to each other for any inclination of the support by pressing their faces together, as will be readily understood from the drawings.

There is a socket, D, connected with the part A of the support, and a ball, E, fastened to the table F. The ball E may be moved about in the socket D, and hence the table F tipped at any desired inclination. I prefer to have the ball simply rest in the socket, so that the table may be readily removed from its support.

Upon the table F is a sheet of rubber, G, fastened to the table (to form a part thereof) at a few places by tacks $i$ or other suitable fastenings. This sheet G is not a continuous one, but is so cut or formed as to have the several ends, flaps, or points $j$, which extend in different directions in the plane of the sheet and are in a measure free—that is, may be lifted more or less from contact with the body of the table.

It will be found that if a glass or other smooth plate (represented by the dotted lines in Fig. 1) be placed on the table F, having the rubber sheet G thereon, the table and plate may be inclined at a much greater angle with a horizontal plane, and the plate not slide on the table, than if the sheet G, formed as set forth, were not between the body of the table and the plate; and it will be also found that the friction between a sheet of rubber, formed as described, and a smooth plate will be greater than that between the same smooth plate and a simple continuous sheet of rubber. Increasing the friction between the table and a plate or similar object placed thereon to prevent the same from sliding from the table is particularly advantageous in the manipulation by photographers, as stated above, and is also more generally useful. Rocking the table by means of the ball and socket, and adjusting the support at any angle, and the use of the clamp C, are needful in the device, as adapted to the use of photographers.

The shape and number of the ends, flaps, or points $j$ may be varied from that shown and still accomplish a like result. Other material beside rubber might be employed, but probably with any other material convenient to use there would be less friction.

It will be seen that if the table be removed from the support and be placed in a reversed position on a plane it would not slide though said plane be considerably inclined, thus illustrating how a block or other articles for various purposes might be made so that it would not slide on an inclined plane by fastening on its under side a sheet of rubber or other material formed as set forth.

I claim as my invention—

1. A photographic table covered with a sheet of rubber or analogous material, such sheet being formed with projecting ends or flaps extending in the plane of the sheet, substantially as set forth.

2. A table having a sheet fastened thereon and formed as set forth, in combination with a support, and a ball and socket connecting said table with said support, substantially as described.

3. Table F, sheet G, adjustable support A B, and clamp C, in combination, substantially as described.

DAVID M. LITTLE.

Witnesses:
EDW. DUMMER,
JOSEPH SELIG.